United States Patent
Mau et al.

(10) Patent No.: US 7,799,163 B1
(45) Date of Patent: Sep. 21, 2010

(54) SUBSTRATE-SUPPORTED ALIGNED CARBON NANOTUBE FILMS

(75) Inventors: Albert Mau, Wheelers Hill (AU); Li-ming Dai, Wheelers Hills (AU); Shaoming Huang, Clayton (AU)

(73) Assignee: University of Dayton, Dayton, OH (US)

( * ) Notice: Subject to any disclaimer, the term of this patent is extended or adjusted under 35 U.S.C. 154(b) by 779 days.

(21) Appl. No.: 09/979,792

(22) PCT Filed: May 25, 2000

(86) PCT No.: PCT/AU00/00550

§ 371 (c)(1), (2), (4) Date: May 1, 2002

(87) PCT Pub. No.: WO00/73204

PCT Pub. Date: Dec. 7, 2000

(30) Foreign Application Priority Data

May 28, 1999 (AU) .................................... PQ0650

(51) Int. Cl.
- C01B 31/02 (2006.01)
- H01J 9/02 (2006.01)
- B29C 65/50 (2006.01)
- B29C 65/02 (2006.01)
- B32B 37/14 (2006.01)
- B44C 1/16 (2006.01)
- B32B 37/26 (2006.01)
- B05D 5/12 (2006.01)
- B41M 3/12 (2006.01)
- C23C 16/22 (2006.01)
- B32B 37/02 (2006.01)
- B32B 38/18 (2006.01)
- C23C 16/04 (2006.01)

(52) U.S. Cl. .................. 156/247; 156/230; 156/231; 156/234; 156/273.3; 156/273.5; 156/289; 427/81; 427/146; 427/147; 427/148; 427/249.17; 427/255.21; 427/294; 428/195.1; 428/914

(58) Field of Classification Search .................. 156/230, 156/231, 234, 241, 247, 289, 273.3, 273.5; 427/96, 146, 147, 148, 248.1, 249.1, 255.21, 427/255.68, 294, 81, 249.17, 214; 428/195, 428/914, 195.1; 313/309

See application file for complete search history.

(56) References Cited

U.S. PATENT DOCUMENTS 4,720,317 A * 1/1988 Kuroda et al. ............... 156/250

(Continued)

FOREIGN PATENT DOCUMENTS

| EP | 0 947 466 A | 10/1999 |
|---|---|---|
| WO | WO 98/42620 A | 10/1998 |
| WO | WO 99/65821 A | 12/1999 |

OTHER PUBLICATIONS

Chemical Physics Letters 316 (2000) 349-355 Jan. 21, 2000, Structure and Growth of Aligned Carbon Nanotube Films by Pyrolysis, D-C. Li.

European Search Report dated Apr. 22, 2004.

(Continued)

*Primary Examiner* — Philip C Tucker
*Assistant Examiner* — Sonya Mazumdar
(74) *Attorney, Agent, or Firm* — Dinsmore & Shohl LLP

(57) ABSTRACT

This invention relates to a process for preparing a substrate-supported aligned carbon nanotube film including: synthesizing a layer of aligned carbon nanotubes on the substrate capable of supporting nanotube growth, applying a layer of a second substrate to a top surface of aligned carbon nanotube layer, removing said substrate capable of supporting nanotube growth to provide an aligned carbon nanotube film supported on said second substrate.

23 Claims, 4 Drawing Sheets

U.S. PATENT DOCUMENTS

| | | | |
|---|---|---|---|
| 5,441,846 A * | 8/1995 | Nagate et al. | 430/259 |
| 5,726,524 A | 3/1998 | Debe | |
| 5,872,422 A | 2/1999 | Xu et al. | |
| 5,973,444 A | 10/1999 | Xu et al. | |
| 6,062,931 A | 5/2000 | Chuang et al. | |
| 6,097,138 A * | 8/2000 | Nakamoto | 313/309 |
| 6,232,706 B1 * | 5/2001 | Dai et al. | 313/309 |
| 6,333,598 B1 * | 12/2001 | Hsu et al. | 313/495 |
| 6,340,822 B1 * | 1/2002 | Brown et al. | 257/25 |
| 6,628,053 B1 * | 9/2003 | Den et al. | 313/310 |
| 7,195,733 B2 * | 3/2007 | Rogers et al. | 264/496 |
| 7,439,731 B2 * | 10/2008 | Crafts et al. | 324/158.1 |
| 2009/0183816 A1 * | 7/2009 | Min et al. | 156/62.2 |

OTHER PUBLICATIONS

Che G et al: "Chemical Vapor Deposition Based Synthesis of Carbon Nanotubes and Nanofibers Using a Template Method" Chemistry of Materials, American Chemical Society, Washington, US, vol. 10, No. 1, 1998, pp. 260-267, XP000776644.

Dai Liming et al: "Multilayer Carbon Nanotube Films" WO 00/63115 A, Oct. 26, 2000.

Huang S et al: "Patterned Growth and Contact Transfer of Well-Aligned Carbon Nanotube Films" Journal of Physical Chemistry. B, Materials, Surfaces, Interfaces and Biophysical, Washington, DC, US, vol. 103, No. 21, May 27, 1999, pp. 4223-4227, XP000957804.

Li W Z et al: "Large-Scale Synthesis of Aligned Carbon Nanotubes" Science, American Association for The Advancement of Science, US, vol. 274, Oct. 17, 1996, pp. 1701-1703, XP000877484.

Rao C N R et al: "Large Aligned-Nanotube Bundles from Ferrocene Pyrolysis" Chemical Communications—Chemcom, Royal Society of Chemistry, GB, No. 15, 1998, pp. 1525-1526, XP002957638.

\* cited by examiner

25nm

SUBSTRATE-SUPPORTED ALIGNED CARBON NANOTUBE FILMS

BACKGROUND OF THE INVENTION

This invention relates to carbon nanotube materials and processes for their preparation. In particular the invention relates to substrate supported aligned carbon nanotube films, processes for their preparation and their use in the preparation of multilayer carbon nanotube materials. The invention also relates to the construction of devices from such materials for practical applications in many areas including as electron field emitters, artificial actuators, chemical sensors, gas storages, molecular-filtration membranes, energy-absorbing materials, molecular transistors and other optoelectronic devices.

Carbon nanotubes usually have a diameter in the order of tens of angstroms and the length of up to several micrometers. These elongated nanotubes consist of carbon hexagons arranged in a concentric manner with both ends of the tubes normally capped by pentagon-containing, fullerene-like structures. They can behave as a semiconductor or metal depending on their diameter and helicity of the arrangement of graphitic rings in the walls, and dissimilar carbon nanotubes may be joined together allowing the formation of molecular wires with interesting electrical, magnetic, nonlinear optical, thermal and mechanical properties. These unusual properties have led to diverse potential applications for carbon nanotubes in material science and nanotechnology. Indeed, carbon nanotubes have been proposed as new materials for electron field emitters in panel displays, single-molecular transistors, scanning probe microscope tips, gas and electrochemical energy storages, catalyst and proteins/DNA supports, molecular-filtration membranes, and energy-absorbing materials (see, for example: M. Dresselhaus, et al., *Phys. World,* January, 33, 1998; P. M. Ajayan, and T. W. Ebbesen, *Rep. Prog. Phys.,* 60, 1027, 1997; R. Dagani, *C&E News,* Jan. 11, 31, 1999).

For most of the above applications, it is highly desirable to prepare aligned carbon nanotubes so that the properties of individual nanotubes can be easily assessed and they can be incorporated effectively into devices. Carbon nanotubes synthesised by most of the common techniques, such as arc discharge (Iijima, S. *Nature* 354, 56-68, 1991; Ebbesen, T. W. & Ajayan, P. M. *Nature* 358, 220-222, 1992) and catalytic pyrolysis, (See, for example: M Endo et al. *J. Phys. Chem. Solids* 54, 1841-1848, 1994; Ivanov, V. et al. *Chem. Phys. Let.* 223, 329-335, 1994) often exist in a randomly entangled state. However, aligned carbon nanotubes have recently been prepared either by post-synthesis manipulation (see, for example: Aegean, P. M., et al. *Science* 265, 1212-1214, 1994; De Heer, W. A. et Al. *Science* 268, 845-847) or by synthesis-induced alignment (see, for example: W. Z. Li, *Science,* 274, 1701, 1996; Che, G., *Nature,* 393, 346, 1998; Z. G. Ren, et al., *Science,* 282, 1105, 1998; C. N., Rao, et al., *J.C.S., Chem. Commun.,* 1525, 1998).

Where the aligned nanotubes are prepared by post-synthesis manipulation, they are generally aligned in the plane parallel to the surface, whereas when the aligned carbon nanotubes are prepared by approaches which involve synthesis-induced alignment, the carbon nanotubes are aligned perpendicularly to the substrate. The choice of substrates upon which aligned carbon nanotubes may be grown is strongly limited by the conditions under which the nanotubes are synthesised. For many potential applications of aligned carbon nanotubes it would be convenient to provide the aligned carbon nanotubes on a substrate which is different from the substrate upon which the perpendicularly aligned carbon nanotubes are grown.

Further, multilayer structures built up from aligned carbon nanotubes are of vital interest, as the use of multilayered semiconductor materials and devices is highly desirable for many applications. Examples include the use of molecular-beam epitaxy for making superlattices consisting of the alternating layers of gallium arsenide and aluminium arsenide as hetero-structured semiconductor materials (M. A. Herman and H. Sitter, *"Beam Epitaxy: Fundamentals and Current Status",* Springer-Verlag, Berlin, 1989), the use of Langmuir-Blodgett and chemical vapor deposition techniques for construction of organic field-emission transistors (M. F. Rubner and T. A. Skotheim, in *"Conjugated Polymers",* J. L. Brédas and R. Silbey (eds.), Kluwer Academic Publishers, Dordrecht, 1991; G. Horowitz, *Adv. Mater.,* 10, 365, 1998), and the use of layer-by-layer adsorption and solution-spinning methods for preparing multilayer thin films of conjugated polymers as organic light-emitting diodes (S. A. Jenekhe and K. J. Wynne, *"Photonic and Optoelectronic Polymers",* ACS Sym. Ser. 672, ACS Washington, D.C., 1995; L. Dai, *J. Macromole. Sci., Rev. Macromole. Chem. Phys.* 1999, 39(2), 273-387). The overall properties of multilayer materials and/or devices are highly dependent not only on the intrinsic properties of the constituent materials in each of the layers but also the particular layer stacking sequence, and the interface and surface structures, thus adding additional parameters for the design and control of their behaviours. Accordingly there is a need for a method of transferring aligned carbon nanotube films from the substrate on which they are synthesised to other substrates.

It has now been unexpectedly found that aligned carbon nanotubes can be readily peeled off the substrate on which they are synthesised by applying a layer of a second substrate to the top surface of the aligned carbon nanotube layer and peeling off the aligned carbon nanotubes together with the second substrate.

SUMMARY OF THE INVENTION

According to a first aspect, the present invention provides a process for preparing a substrate-supported aligned carbon nanotube film including:
  synthesising a layer of aligned carbon nanotubes on a substrate capable of supporting nanotube growth,
  applying a layer of a second substrate to a top surface of aligned carbon nanotube layer,
  removing said substrate capable of supporting nanotube growth to provide an aligned carbon nanotube film supported on said second substrate.

Transferring the aligned carbon nanotube film from the substrate on which it is synthesised to another substrate while maintaining the integrity of the aligned carbon nanotube film increases the potential applications of aligned carbon nanotube films, and provides a convenient route to the preparation of multilayer materials containing aligned carbon nanotube layers in which the aligned carbon nanotubes are attached to or interspersed between layers of materials which are not capable of supporting carbon nanotube growth.

The aligned carbon nanotube layer may be synthesised on the substrate in accordance with techniques known to the art for the synthesis of perpendicularly aligned carbon nanotubes. Preferably the synthesis of the aligned carbon nanotubes is achieved by pyrolysis of a carbon-containing material in the presence of a suitable catalyst for nanotube formation.

The carbon-containing material may be any compound or substance which includes carbon and which is capable for forming carbon nanotubes when subjected to pyrolysis in the presence of a suitable catalyst. Examples of suitable carbon-containing materials include alkanes, alkenes, alkynes or aromatic hydrocarbons and their derivatives, for example methane, acetylene, benzene, organometallic compounds of transition metals, such as Fe(II) phthalocyanine, and metallocenes such as ferrocene and nickel dicyclopentadiene, and any other suitable evaporable metal complex.

The catalyst may be any compound, element or substance suitable for catalysing the conversion of a carbon-containing material to aligned carbon nanotubes under pyrolytic conditions. The catalyst may be a transition metal, such as Fe, Co, Al, Ni, Mn, Pd, Cr or alloys thereof in any suitable oxidation state.

The catalyst may be incorporated into the substrate or may be included in the carbon-containing material. Examples of carbon-containing materials which include a transition metal catalyst are Fe(II) phthalocyanine, Co(II)phthalocyanine, Ni(II) phthalocyanine and ferrocene. When the catalyst and carbon-containing material are included in the same material it may be necessary to provide sources of additional catalyst or additional carbon-containing material. For example, when ferrocene is used as the catalyst and a source of carbon, it is necessary to provide an additional carbon source, such as ethylene, to obtain the required nanotube growth.

The pyrolysis conditions employed will depend on the type of carbon-containing material employed and the type of catalyst, as well as the length and density of the nanotubes required. In this regard it is possible to vary the pyrolysis conditions, such as the temperature, time, pressure or flow rate through the pyrolysis reactor, to obtain nanotubes having different characteristics.

For example, performing the pyrolysis at a higher temperature may produce nanotubes having different base-end structures relative to those prepared at a lower temperature. The pyrolysis will generally be performed with a temperature range of 500° C. to 1100° C. Similarly lowering the flow rate through a flow-type pyrolysis reactor may result in a smaller packing density of the nanotubes and vice versa. A person skilled in the art would be able to select and control the conditions of pyrolysis to obtain nanotubes having the desired characteristics.

The substrate capable of supporting nanotube growth may be any substrate which is capable of withstanding the pyrolysis or CVD (chemical vapour deposition) conditions employed for nanotube growth, and which is capable of supporting the aligned carbon nanotube growth. Examples of suitable substrates include all types of glass that provide sufficient thermal stability according to the synthesis temperature applied, such as quartz glass, as well as mesoporous silica, silicon water, nanoporous alumina, ceramic plates, graphite and mica. Preferably the substrate is glass, in particular, quartz glass, or silicon wafer. The substrate capable of supporting aligned carbon nanotube growth may also be one of the substrates described above which has been coated with a metal, metal oxide, metal alloy or compound thereof, which may have conducting or semiconducting properties. The metal may be any suitable metal which is capable of supporting nanotube growth under the conditions employed. Examples of suitable metals include Au, Pt, Cu, Cr, Ni, Fe, Co and Pd. The substrate may also be coated in a metal oxide, such as indium tin oxide (ITO), $Al_2O_3$, $TiO_2$ or MgO, or a semi-conductor material, such as gallium arsenide, aluminium arsenide, aluminium sulphide or gallium sulphide.

The "second substrate" applied to the top surface of the aligned carbon nanotube layer may be any substrate which can be applied to the top surface of such a perpendicularly aligned carbon nanotube layer in a way which allows the aligned carbon nanotubes to be peeled from the substrate on which it was synthesised while largely maintaining its integrity. Examples of suitable substrates include metals, such as Au, Al, Pd, Cr, Fe, Co, Mn, and any other metals, alloys, or metal oxides which are suitable for film formation, for example by sputter coating, and polymer films, including adhesive-coated polymer films, such as cellulose tapes. Other suitable polymers include conjugated (conducting) polymers, temperature/pressure responsive polymers, bioactive polymers and engineering resins.

Where the second substrate is a metal, it may be applied to the top surface of the nanotube film using the suitable technique, such as by sputter-coating, chemical vapour deposition or electrochemical deposition. Where the second substrate is a polymer, this may be applied to the surface as a polymer film, such as a cellulose tape, or the polymer may be sprayed, brushed, or otherwise applied to the surface in such a way that a polymer film is formed on the surface. If necessary, this polymer film can be cured, (e.g. by application of light heat etc.) to form a film which is bonded to the top surface of the nanotube layer in such a way that the nanotubes can be separated from the substrate upon which they were synthesised.

There will generally be a single layer of aligned carbon nanotubes on the substrate, however in certain circumstances, further layers of aligned nanotubes may be synthesised on the surface of the substrate. Accordingly, unless otherwise indicated, a reference to the synthesis of a layer of aligned carbon nanotubes on a substrate, includes a reference to the synthesis of more than one layer of nanotubes on the substrate. The substrate supported aligned carbon nanotube films according to the present invention may be used in the form in which they are prepared, or may be incorporated into multilayered structures containing additional layers. These additional layers may be additional carbon nanotube layers or may be layers of other materials, such as metal, metal oxide, semi-conductor material or polymers.

The substrate-supported aligned carbon nanotube films according to the invention and devices, and materials coated with or including these films represent further aspects of the present invention.

As is evident from the above description the invention allows the preparation of a large variety of substrate supported films, multilayer films and structures. It is also possible to provide patterned layers using appropriate masking techniques. The processes of the present invention and the film structures formed may have use in areas such as artificial actuator electrochemistry, nanotube capacitors and optoelectronic devices. Some specific applications may include:

1) electron emitters
2) field-emission transistors
3) electrodes for photovoltaic cells and light emitting diodes
4) optoelectronic elements
5) bismuth actuators
7) chemical and biological sensors
8) gas storages
9) molecular-filtration membranes
10) energy absorbing materials.

BRIEF DESCRIPTION OF THE DRAWINGS

The invention will now be described with reference to the following examples and drawings which illustrate some preferred embodiments of the invention. However it is to be Referring to the drawings.

DETAILED DESCRIPTION OF THE INVENTION

EXAMPLES

Example 1

Preparation of Aligned Carbon Nanotubes on Quartz Glass Plates

Figure 1:
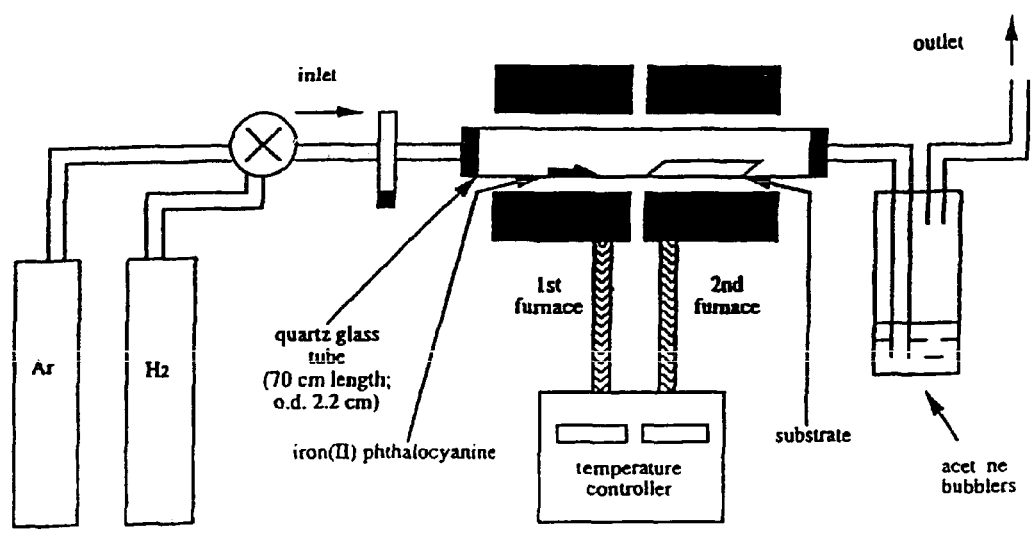
FIG. 1 is a diagrammatic representation of a pyrolysis flow reactor suitable for preparing aligned carbon nanotubes according to the invention.
Figure 2A:
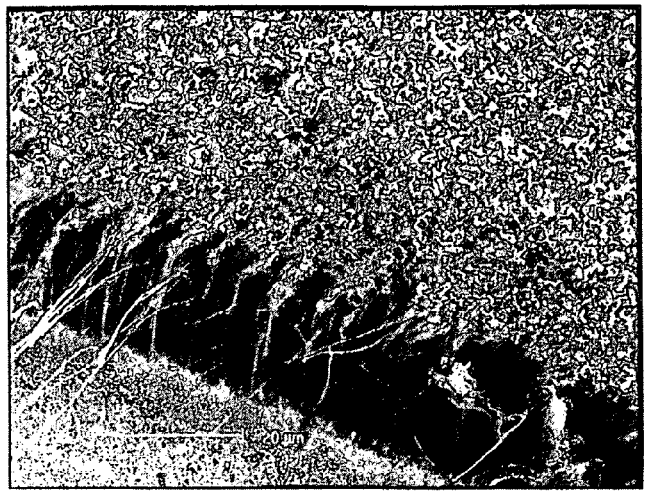
FIG. 2a is a scanning electron microscopic image of aligned carbon nanotubes prepared by pyrolysis of iron II phthalocyanine under ArlH$_2$.
Figure 2B:
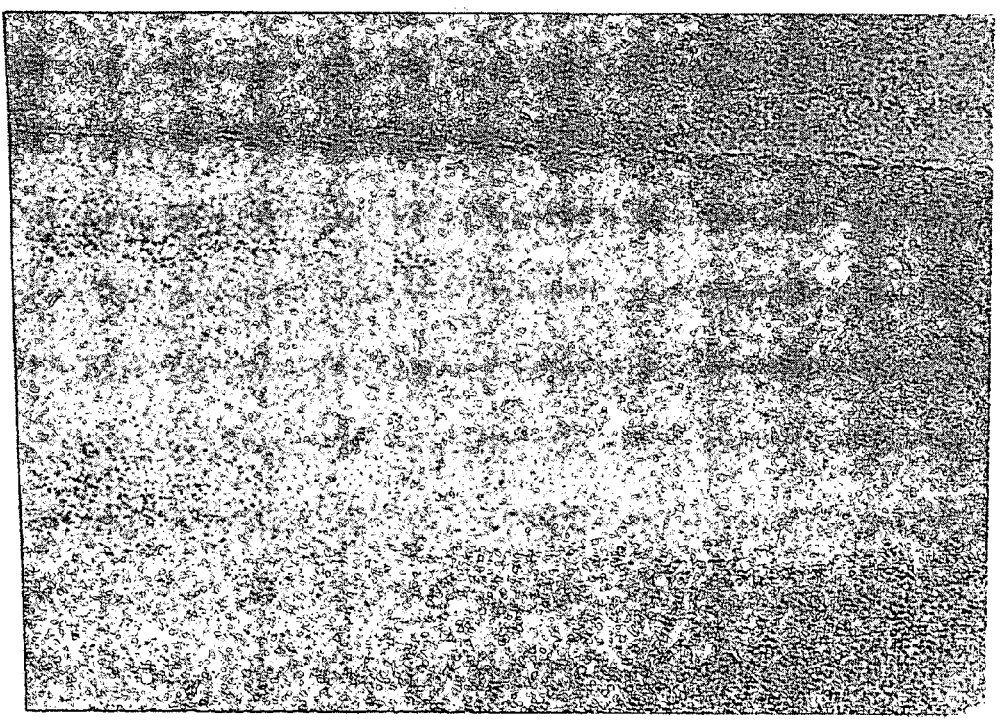
FIG. 2b is a high resolution transmission electron microscopic image of an individual nanotube.

Aligned carbon nanotubes were prepared by pyrolysis of iron (II) phthalocyanine under Ar/H$_2$ at 800-1100° C. using a quartz plate in a flow reactor consisting of a quartz glass tube and a dual furnace fitted with independent temperature controllers (FIG. 1). FIG. 2 represents a typical scanning electron microscopic (SEM, XL-30 FEG SEM, Philips, at 5 KV) image of the carbon nanotubes, showing that the as-synthesised nanotubes align almost normal to the substrate surface. The aligned nanotubes are densely packed with a fairly uniform tubular length of ca. 25 μm. However, the length of the aligned nanotubes can be varied over a wide range (From a few to several tens of micrometers) in a controllable fashion by changing the experimental conditions (e.g. the pyrolysis time, flow rate). A well-graphitised structure with ca. 40 concentric carbon shells and an outer diameter of ca. 40 nm is illustrated in the high resolution transmission electron microscopic (HR-TEM, CM30, Philips, at 300 KV) image of an individual nanotube (FIG. 2b).

Example 2

Preparation of Substrate-supported Aligned Carbon Nanotubes

Figure 3:
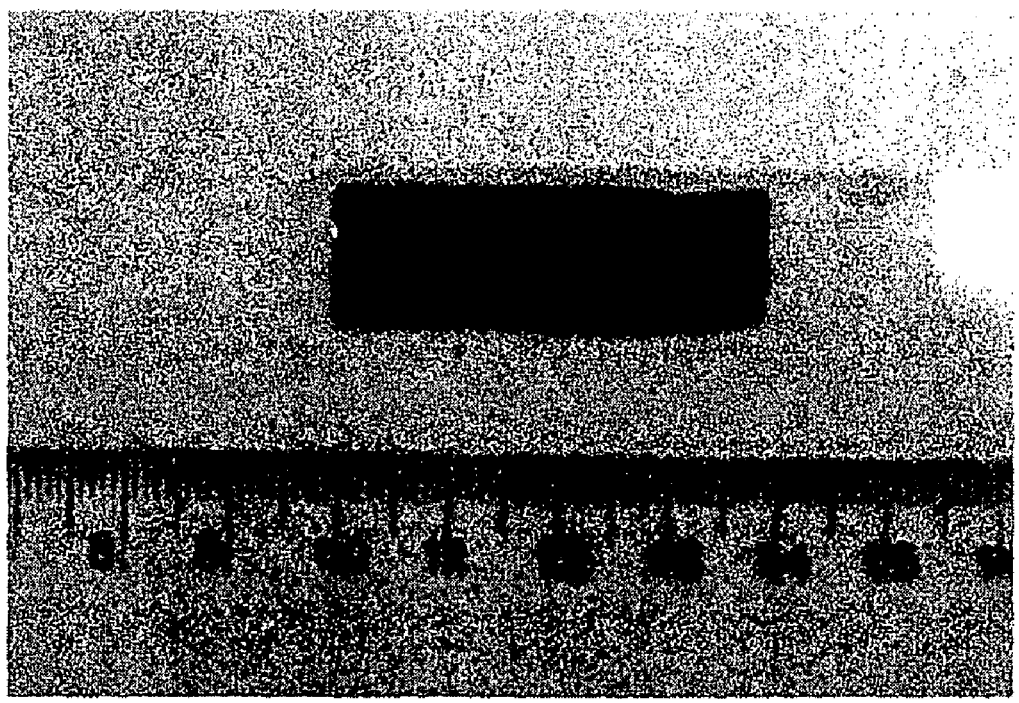
FIG. 3 is a scanning electron microscopic image of an aligned-carbon nanotube layer on gold foil.
Figure 4:
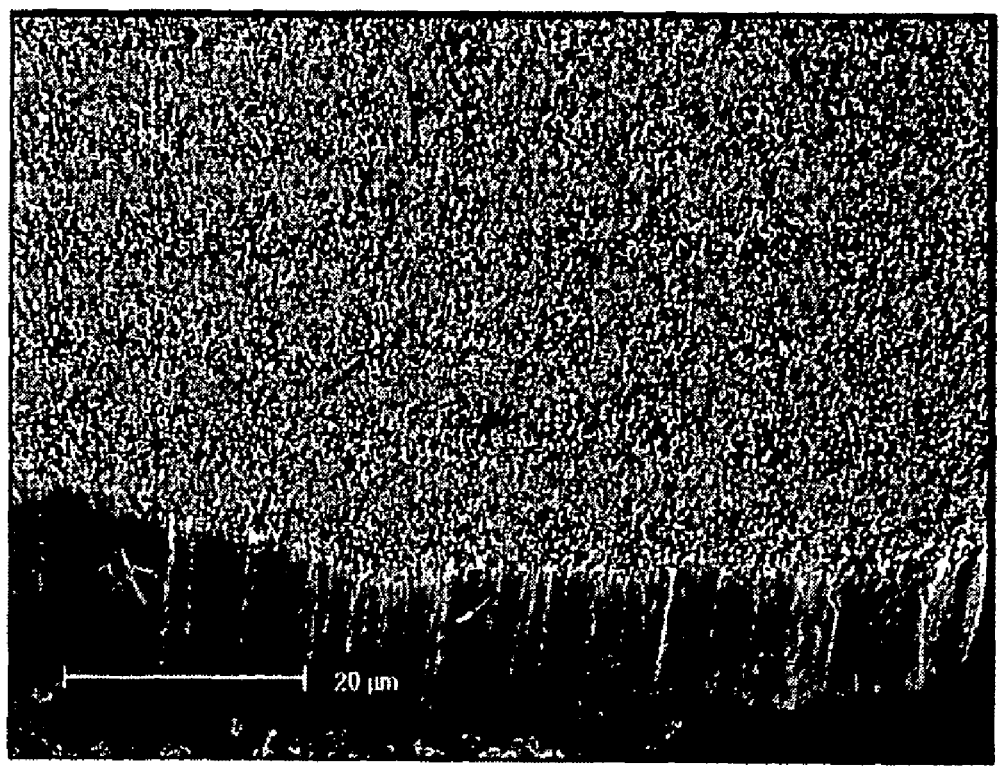
FIG. 4 is a scanning electron microscopic image of a layer of aligned-carbon nanotubes on a gold foil.

On the top of the carbon nanotubes prepared in Example 1, a thin layer of sputtered metal (e.g. Au, Pt, Al, Cr, Ni, ITO, Al$_2$O$_3$, etc) was deposited. Then, the bilayer film of aligned nanotubes and sputtered metal was peeled off from the quartz substrate as a free standing film. FIG. 3 shows a photograph of a film of the aligned nanotubes on a gold foil (ca. 4×1 cm$^2$). The size of the aligned nanotube/Au films is only limited by the size of the nanotube films, which in its turn is essentially only limited by the size of the reactor used for the synthesis of the nanotubes (Huang, S. et al. *J. Phys. Chem. B*, 103 issue 21, 4223-4227, 1999). As shown in FIG. 4, the transferred nanotubes on the gold foil are still aligned normal to the substrate surface.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

What is claimed is:

1. A process for preparing a substrate-supported aligned carbon nanotube film including:
   synthesising a layer of aligned carbon nanotubes on a substrate capable of supporting nanotube growth, such that the aligned carbon nanotubes are perpendicular to the surface of the substrate,
   applying a film of a second substrate to a top surface of said synthesised layer of aligned carbon nanotubes wherein the second substrate is a metal, alloy or metal oxide capable of film formation, and
   removing said substrate capable of supporting nanotube growth to provide an aligned carbon nanotube film supported on said film of a second substrate.

2. A process for preparing a substrate-supported aligned carbon nanotube film including:
   synthesising a layer of aligned carbon nanotubes on a substrate capable of supporting nanotube growth, such that the aligned carbon nanotubes are perpendicular to the surface of the substrate,
   applying a film of a second substrate to a top surface of said synthesised layer of aligned carbon nanotubes, wherein the second substrate is cellulose tape, and
   removing said substrate capable of supporting nanotube growth to provide an aligned carbon nanotube film supported on said film of a second substrate.

3. The process according to claim 1 wherein the aligned carbon nanotubes are synthesised by pyrolysis of a carbon-containing material in the presence of a suitable catalyst for nanotube formation.

4. The process according to claim 3 wherein the carbon-containing material is selected from the group consisting of alkanes, alkenes, alkynes or aromatic hydrocarbons and their derivatives, organometallic compounds of transition metals and other suitable evaporable metal complexes.

5. The process according to claim 4 wherein the carbon-containing material is selected from the group consisting of methane, acetylene and benzene.

6. The process according to claim 4 wherein the carbon-containing material is Fe(II) phthalocyanine.

7. The process according to claim 4 wherein the carbon-containing material is selected from the group consisting of ferrocene and nickel dicyclopentadiene.

8. The process according to claim 3 wherein the catalyst is a transition metal.

9. The process according to claim 8 wherein the transition metal is selected from the group consisting of Fe, Co, Al, Ni, Mn, Pd, Cr and alloys thereof in any suitable oxidation state.

10. The process according to claim 3 wherein the catalyst is incorporated into the substrate.

11. The process according to claim 3 wherein the catalyst is included in the carbon-containing material.

12. The process according to claim 11 wherein the catalyst is selected from the group consisting of Fe(II) phthalocyanine, Co(II) phthalocyanine, Ni(II) phthalocyanine and ferrocene.

13. The process according to claim 11 further comprising an additional source of catalyst.

14. The process according to claim 11 further comprising a source of carbon-containing material additional to the carbon provided by the catalyst.

15. The process according to claim 3 wherein pyrolysis is performed at a temperature in the range of 800° C.-1100° C.

16. The process according to claim 1 wherein the substrate capable of supporting nanotube growth is selected from the group consisting of glass, mesoporous silica, silicon wafer, nanoporous alumina, ceramic plates, glass, graphite and mica.

17. The process according to claim 16 wherein the substrate capable of supporting nanotube growth is quartz glass or silicon wafer.

18. The process according to claim 1 wherein the substrate capable of supporting nanotube growth is coated with a metal, a metal oxide or a semiconductor material.

19. The process according to claim 18 wherein the metal is selected from the group consisting of Au, Pt, Cu, Cr, Ni, Fe, Co and Pd.

20. The process according to claim 18 wherein the metal oxide is selected from the group consisting of indium tin oxide (ITO), $Al_2O_3$, $TiO_2$ and MgO.

21. The process according to claim 18 wherein the semiconductor material is selected from the group consisting of gallium arsenide, aluminium arsenide, aluminium sulphide and gallium sulphide.

22. The process according to claim 1 wherein the metal is selected from the group consisting of Au, Al, Pd, Cr, Fe, Co and Mn.

23. The process according to claim 1 wherein the film of said second substrate is applied to the top surface of the synthesised layer of aligned carbon nanotubes by sputter-coating, chemical vapour deposition or electrochemical deposition.

\* \* \* \* \*